United States Patent
Mezei et al.

(10) Patent No.: US 9,596,223 B1
(45) Date of Patent: Mar. 14, 2017

(54) CROSS-SITE, TOTP-BASED TWO FACTOR AUTHENTICATION

(71) Applicant: LogMeIn, Inc., Boston, MA (US)

(72) Inventors: Csaba Mezei, Szeged (HU); Gyula Magyar, Budapest (HU); Kornel Pal, Budapest (HU)

(73) Assignee: LogMeIn, Inc., Boston, MA (US)

( * ) Notice: Subject to any disclaimer, the term of this patent is extended or adjusted under 35 U.S.C. 154(b) by 0 days.

(21) Appl. No.: 15/151,215

(22) Filed: May 10, 2016

(51) Int. Cl.
*H04L 29/06* (2006.01)
*H04W 12/04* (2009.01)
*H04W 12/06* (2009.01)

(52) U.S. Cl.
CPC .......... *H04L 63/067* (2013.01); *H04L 63/068* (2013.01); *H04L 63/083* (2013.01); *H04L 63/0815* (2013.01); *H04L 63/0838* (2013.01); *H04L 63/0846* (2013.01); *H04W 12/04* (2013.01); *H04W 12/06* (2013.01); *H04L 63/108* (2013.01)

(58) Field of Classification Search
None
See application file for complete search history.

(56) References Cited

U.S. PATENT DOCUMENTS

| | | | | |
|---|---|---|---|---|
| 8,595,810 | B1* | 11/2013 | Ben Ayed | H04L 63/0815 713/168 |
| 9,104,853 | B2 | 8/2015 | Mathur et al. | |
| 9,294,476 | B1* | 3/2016 | Lurey | H04L 63/0861 |
| 2005/0177731 | A1* | 8/2005 | Torres | H04L 67/02 713/182 |
| 2014/0189831 | A1* | 7/2014 | Kemshall | H04L 9/3228 726/6 |
| 2015/0281222 | A1* | 10/2015 | Burch | H04L 63/0838 726/6 |

* cited by examiner

*Primary Examiner* — Andrew Steinle
(74) *Attorney, Agent, or Firm* — David H. Judson

(57) ABSTRACT

A host machine has a web browser. A user of the host machine also has a mobile device. A time-based, one-time password (TOTP) authentication scheme leverages a plug-in associated with the browser to automatically inject a received TOTP code into an element of an HTML-based TOTP authentication page, and to programmatically submit the HTML form (e.g., by mimicking the "click to submit" button on the TOTP form). Typically, the TOTP code is obtained following a successful completion of a push notification interaction between a cloud service, which stores TOTP shared secrets that are used to generate the TOTP codes, and the user of the mobile device.

18 Claims, 5 Drawing Sheets

CROSS-SITE, TOTP-BASED TWO FACTOR AUTHENTICATION

BACKGROUND

Technical Field

This disclosure relates generally to security technologies, products and services.

Background of the Related Art

Two-factor authentication (also known as 2FA) is a technology that provides identification of users by combining two different components, such as something that the user knows (e.g., username, password, PIN), and something that the user possesses (USB stick with a secret token, a bank card, a key) or something that is inseparable from the user (e.g. a fingerprint, iris, voice, typing speed, pattern in key press intervals, etc.). If, in an authentication attempt, at least one of the components is missing or supplied incorrectly, the user's identity is not established and access to the resource being protected by two-factor authentication is denied. The something possessed by the user may be a mobile device itself.

A number of two-factor authentication schemes use a Time-based One-time Password (TOTP) scheme, as defined Internet RFC 6238. TOTP is an algorithm that computes a one-time password from a shared secret key and the current time. TOTP is an example of a hash-based message authentication code (HMAC). It combines a secret key with the current timestamp using a cryptographic hash function to generate a one-time password. The timestamp typically increases in 30-second intervals such that passwords generated close together in time from the same secret key are the same. In a typical two-factor authentication application, a user enters his private credential (e.g., username and password) into a website, generates a one-time password (OTP) for the site using TOTP running locally on a smartphone, and types the OTP into the server as well. The server runs the same TOTP algorithm to verify the one-time password entered. The approach requires that a single secret key be shared between the server and the user's device over a secure channel ahead of time.

While TOTP-based two factor authentication works well, to date the known solutions have been tied to individual sites and their associated mobile apps. This is cumbersome to configure and use in practice, as end users have to manually enter the TOTP code. This approach also requires the user to maintain a dedicated mobile app for each site that uses the authentication scheme.

BRIEF SUMMARY

A TOTP-based 2FA scheme works across web sites without requiring the end user to manually enter codes, or to have a dedicated mobile app for each particular site. In this approach, an end user leverages a cloud-based service as a repository for maintaining and securing the TOTP secrets (i.e., a TOTP shared secret per user per site) that are generated as the end user interacts with various TOTP setup pages via a mobile device authenticator app. The cloud service is accessed when the end user subsequently attempts a TOTP-based login from a client browser to one of the sites (whose TOTP shared secret is already maintained in the repository). The client browser executes in a computing machine (e.g., a laptop) distinct from the end user's mobile device. To effect login, the end user opens the browser to a TOTP authentication page. The TOTP-based login attempt from the client browser is detected by a browser plug-in, and this detection initiates a push notification mechanism. In particular, the browser plug-in issues a request to the cloud service, which responds by sending a push notification to the end user mobile device authenticator app. If the end user responds to the push notification (e.g., within a given timeout), the cloud service uses the TOTP secret stored in the repository to generate the TOTP code, which code is then sent back to the browser plug-in. The browser plug-in then injects that code into an HTML login form of the TOTP authentication page, and then automatically submits the form. Thus, the user does not have to manually enter the TOTP code. The user is then logged in automatically to complete the process. This approach works for any site for which the cloud service maintains the TOTP shared secret for the end user. Thus, the cloud service enables the end user to access secure resources without requiring manual entry of TOTP codes, and by using just a single authenticator app instead of having to configure and use multiple different mobile apps across different web sites that implement this form of authentication.

The foregoing has outlined some of the more pertinent features of the subject disclosure. These features should be construed to be merely illustrative. Many other beneficial results can be attained by applying the disclosed subject matter in a different manner or by modifying the subject matter as will be described.

BRIEF DESCRIPTION OF THE DRAWINGS

For a more complete understanding of the disclosed subject matter and the advantages thereof, reference is now made to the following descriptions taken in conjunction with the accompanying drawings, in which:

FIG. 4 depicts the end user web browser and the end user mobile device interaction during the push notification operation initiated by the browser plug-in.

DETAILED DESCRIPTION OF AN ILLUSTRATIVE EMBODIMENT

The technique of this disclosure enables an end user to access a set of "sites" using a conventional TOTP-based two factor authentication (2FA) scheme but without requiring the user to manually enter TOTP codes in a mobile device, or to configure and maintain separate mobile applications (apps) for each site. As used herein, the term "site" typically refers to a website (or some protected portion thereof), but the reference to a "site" should be broadly construed to refer to any protected resource available from a server or other computing entity. Typically, the end user has associated therewith both a mobile device running a mobile authenticator app, as well as a second computing machine, such as a laptop or desktop running a web browser. The mobile authenticator app need not be a dedicated mobile app for the site, or that corresponds to the site's origin. The mobile device may be a smartphone, tablet or wearable (e.g., Apple iPhone® and iPad® tablet, iWatch™, Google® Glass™, and others), an IoT device or appliance, or the like. The mobile authenticator app be downloaded and installed via a mobile application delivery service, such as the Apple® App™ Store, Google Play Store (or equivalents), or it may be provided as a native application on the mobile device.

Figure 1:
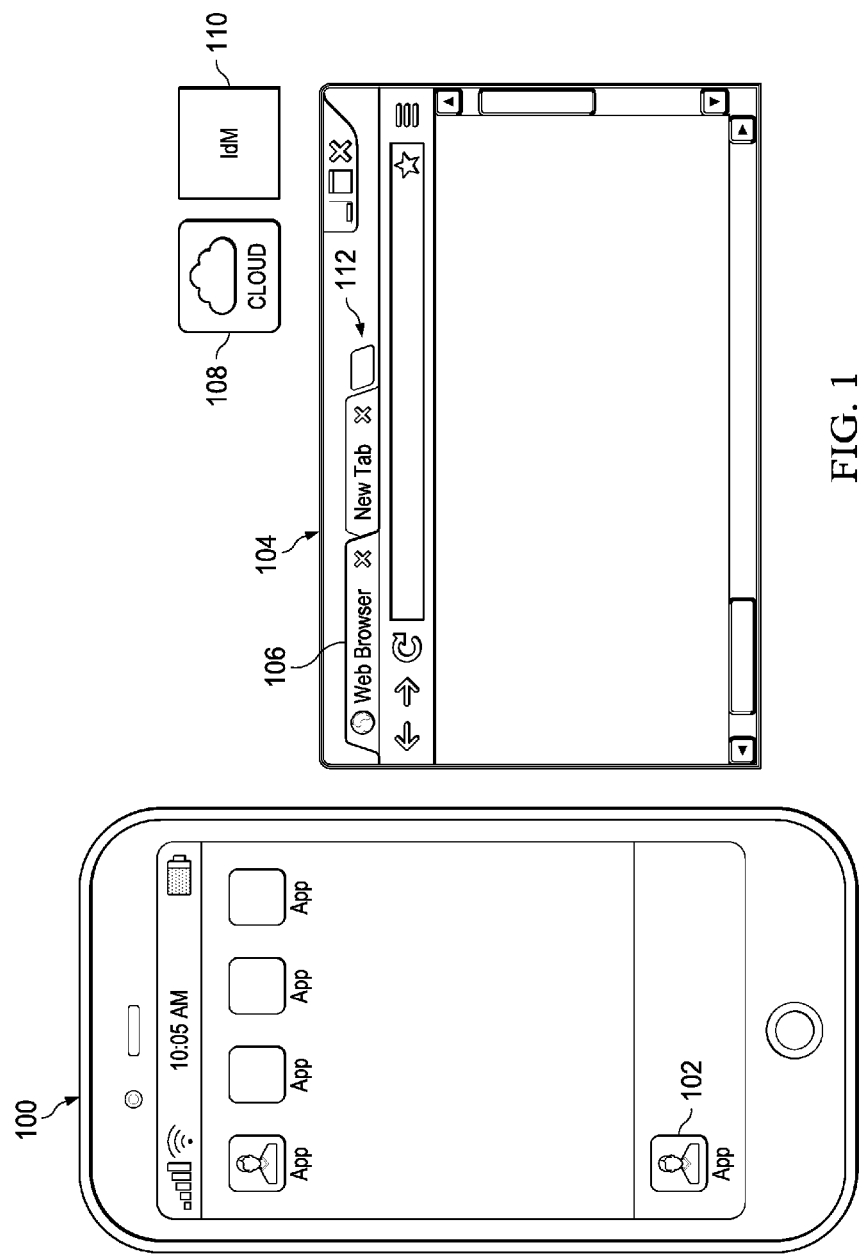
FIG. 1 depicts the various components in which the techniques of this disclosure may be carried out.

Referring now to FIG. 1, the technique of this disclosure involves a set of computing elements: an end user mobile device 100 running a generic authenticator app 102, a computing entity 104 running a web browser 106, and a cloud service 108 having an identity manager 110. The identity manager 110 includes a data repository that stores TOTP secrets (namely, a TOTP-shared secret per user per site). Each of the mobile device 100 and 110 are enabled to provide TOTP-based 2FA. As also depicted, and according to a feature of this disclosure, web browser 106 is augmented with a browser plug-in 112 that facilitates various operations to facilitate cross-site TOTP-based 2FA. Although a browser plug-in 112 is a preferred implementation, the functions of this plug-in may also be implemented in other ways, e.g., an applet, an ActiveX control, JavaScript, native code, or the like. As will be seen, the plug-in 112 obviates manual entry by the end user of the TOTP code, thereby significantly increasing ease of authentication to sites using the described scheme.

In one non-limiting embodiment, the cloud service 108 is implemented in associated with a remote access architecture, such as LogMeIn®.

Cross-Site, TOTP-Based Two Factor Authenticated Access

According to this disclosure, a TOTP-based 2FA scheme works across sites 114a-n without requiring the end user to manually enter TOTP codes, or to have a dedicated mobile app for each particular site. In this approach, an end user leverages the cloud-based service 108 as a repository for maintaining and securing the TOTP secrets (i.e., a TOTP shared secret per user per site) that are generated as the end user interacts with various TOTP setup pages via the generic mobile device authenticator app 102. The notion of "generic" here is not intended to be limiting; it just refers to the fact that the end user need use a distinct mobile app for each site that is enabled for access using TOTP-based authentication. A TOTP code typically is based on the TOTP secret and other factors, such as current date and time.

The cloud service 108 is accessed when the end user subsequently attempts a TOTP-based login from the client browser 106 to one of the sites 114 (whose TOTP shared secret is already maintained in the repository). As noted, the client browser 106 executes in a computing machine (e.g., a laptop) 104 distinct from the end user's mobile device 100. To effect TOTP-based login, the end user opens the browser 106 to a TOTP authentication page. The login attempt from the client browser is detected by the browser plug-in 112, and this detection initiates a push notification mechanism. In particular, and in a preferred embodiment, the browser plug-in 112 issues a request to the cloud service 108, which responds by sending a push notification to the end user mobile device authenticator app 102. If the end user responds to the push notification (e.g., within a given timeout), the cloud service identity manager 110 uses the TOTP secret stored in the repository to generate the TOTP code, which code is then sent back to the browser plug-in 112. Conveniently, the browser plug-in 112 then automatically injects that code into an HTML login form of the TOTP authentication page, and then automatically submits the form. Thus, the user does not have to manually enter the TOTP code or take an affirmative (physical) action to even submit the form that has been filled-in with the TOTP code.

Rather, according to this disclosure, once the user responds to the push notification, both the TOTP code entry and form submission occur in an automated manner under the control of the plug-in. The user is then logged in automatically to complete the process.

The above-described approach works for any site 114 for which the cloud service maintains the TOTP shared secret for the end user. In this manner, the cloud service 108 enables the end user to access secure resources without tedious end user physical interaction with the mobile app. In addition, the approach enables the end user to obtain these advantages using just a single authenticator app 102 (running the TOTP authentication scheme) instead of having to configure and use multiple different mobile apps across different web sites that implement this form of authentication.

Figure 2:
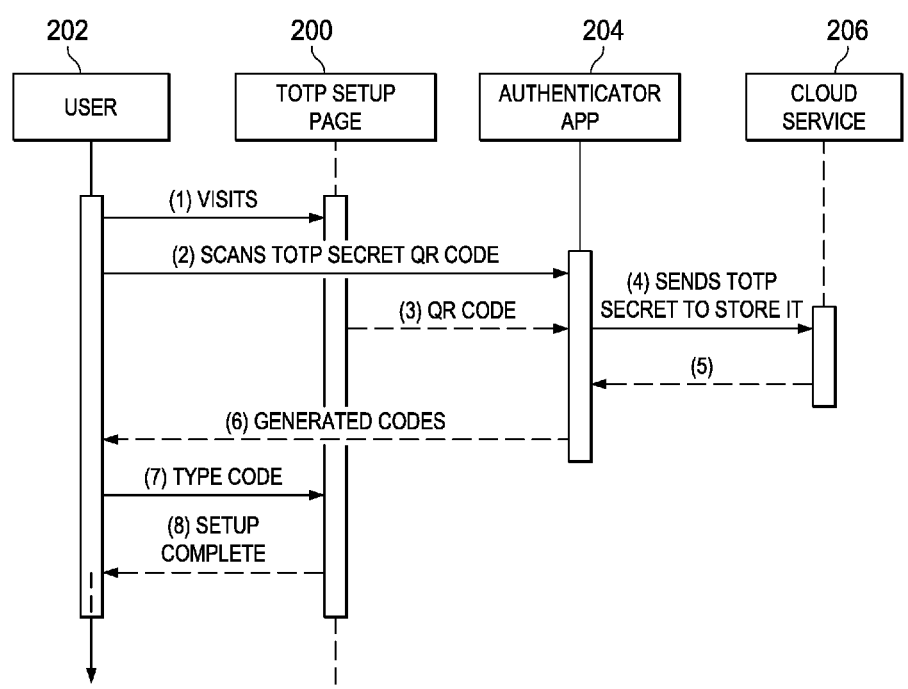
FIG. 2 is a UML interaction diagram depicting a setup flow by which a TOTP shared secret per user per site is generated and maintained in the cloud service.

FIG. 2 depicts a preferred embodiment of a process flow by which the user obtains a TOTP shared secret for a site. As depicted, the site includes a TOTP setup page 200. The setup process begins when the user 202 visits the TOTP setup page 200 at step (1). That setup page displays a QR (or equivalent) code that is then scanned by the user's authenticator app 204 running on the end user's mobile device (which the user is assumed to possess). The authenticator app 204 obtains the scanned QR code at step (3) and uses it to generate the TOTP secret for the user for the site. In an alternative, the user may manually enter information from which the TOTP secret for the user for the site is generated. At step (4), the TOTP secret (for the user for the site) is sent to the cloud service 206, which stores it in its associated identity manager. The cloud service 206 also uses the TOTP secret to generate a TOTP code, which is then returns to the authenticator app 204 at step (5). The authenticator app 204 then outputs the TOTP code to the user at step (6). At step (7), the end user types the code into the TOTP setup page 200. As described, during the actual site authentication the end user does not need to enter any code manually, as the browser plug-in is used for this purpose. At step (8), the TOTP setup page returns an indication that setup is complete. As a result, the authenticator app 204 is now enabled to access the site using TOTP-based authentication. This process is then repeated for each site; as a consequence, the cloud service data repository stores a set of TOTP secrets for the end user (one per site). There may be as many TOTP secrets stored in the repository as there are TOTP-based 2FA accessible sites, but only the single authenticator app 204 is required to enable this configuration.

Figure 3:
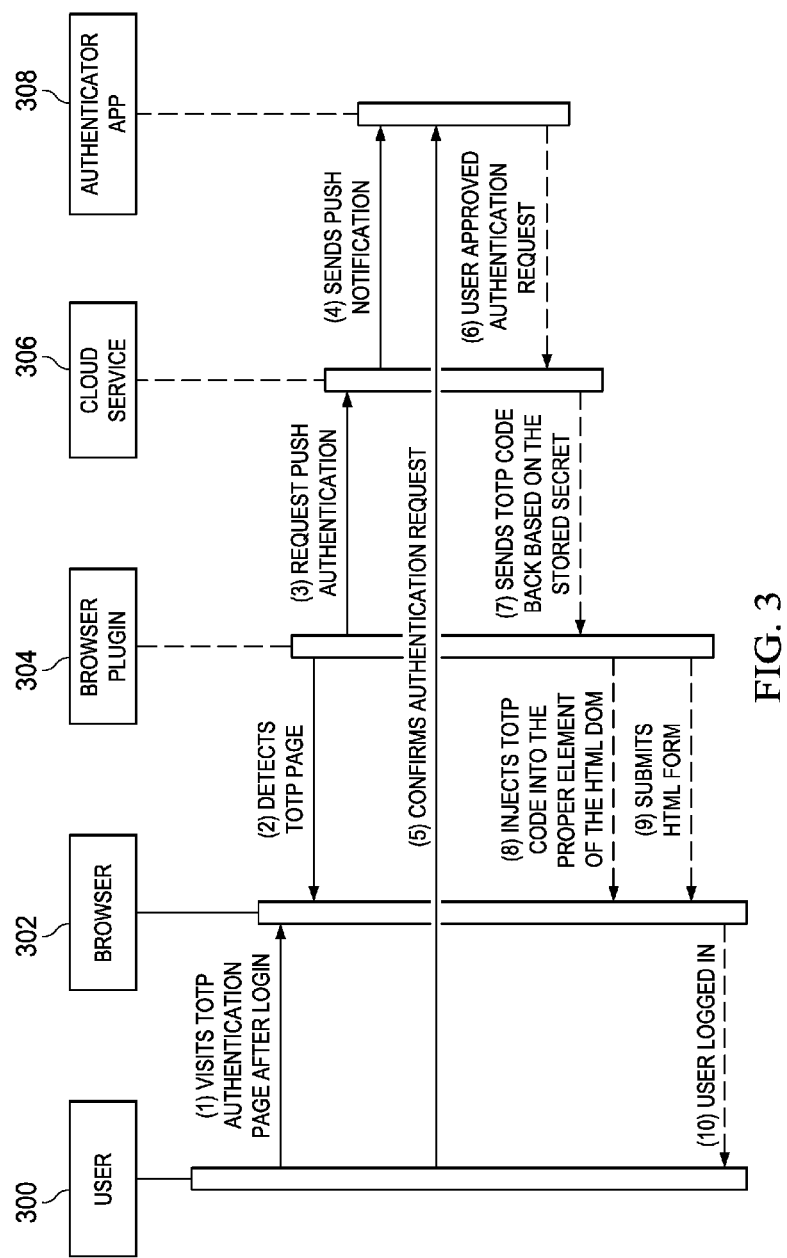
FIG. 3 is a UML interaction diagram depicting a login flow by which an end user logs into a site protected by TOTP-authentication using the technique of this disclosure.

FIG. 3 depicts a preferred embodiment of a process flow by which the user obtains TOTP-based authenticated access to one of the sites protected by the authentication scheme. The process assumes that the setup flow shown in FIG. 2 has been executed for a number of sites.

The routine begins at step (1) with the user 300 opening his or her browser 302 to the site's TOTP authentication page, which may require a previous login. At step (2), the browser plug-in 304 detects the TOTP authentication page being rendered in the browser 302. At step (3), the browser plug-in 304 calls an application programming interface (API) of the cloud service 306 to request push authentication. At step (4), the cloud service 306 sends a push notification to the end user's mobile device authenticator app 308, which is the same app used during the setup flow. At step (5), the user confirms the authentication request. At step (6), the authenticator app notifies the cloud service 306 that the user has approved the authentication request. The cloud service 306 then uses the stored TOTP shared secret for the user for the site to generate a TOTP code that will remain valid for a given time (e.g., 30 seconds). At step (7), the cloud service 306 sends that TOTP code back to the browser plug-in 304.

At step (8), and according to this disclosure, the browser plug-in automatically injects the received TOTP code into the appropriate element of the HTML DOM (document object model) of the TOTP authentication page. Typically, this element is an HTML fill-in form. In this manner, the user does not need to type in the TOTP code manually; rather, at step (9), the browser plug-in 304 also programmatically submits the HTML form (e.g., by mimicking the "click to submit" button on the TOTP form), and by this action the user is logged in at step (10) automatically. This completes the process for the user's TOTP-authentication to this site.

Using just the single mobile device authenticator app, a similar login process may then be carried out at any other site for which the cloud service maintains the TOTP shared secret for the user.

Thus, according to this technique, the cloud service is augmented to store a TOTP shared secret per user per site. The cloud service also is enabled, e.g., through a cloud service API, to send back to the browser plug-in calculated TOTP codes. The authenticator app is augmented to provide the capability to call the cloud service API to store the TOTP shared secret per user per site in the cloud repository. The browser is augmented to include the browser plug-in (or equivalent code), which provides various functions to automate and streamline the TOTP mechanism, namely: the ability to detect if the user is visiting a TOTP authentication page, the ability to call the cloud service API to send out a push notification to the authenticator app, the ability to poll the cloud service, e.g., through a web API, to determine if the user confirmed (allowed) the authentication request, the ability to inject the TOTP code to the proper HTML element of the TOTP authentication page, and the ability to mimic the click on submit button of the TOTP form.

Figure 4:
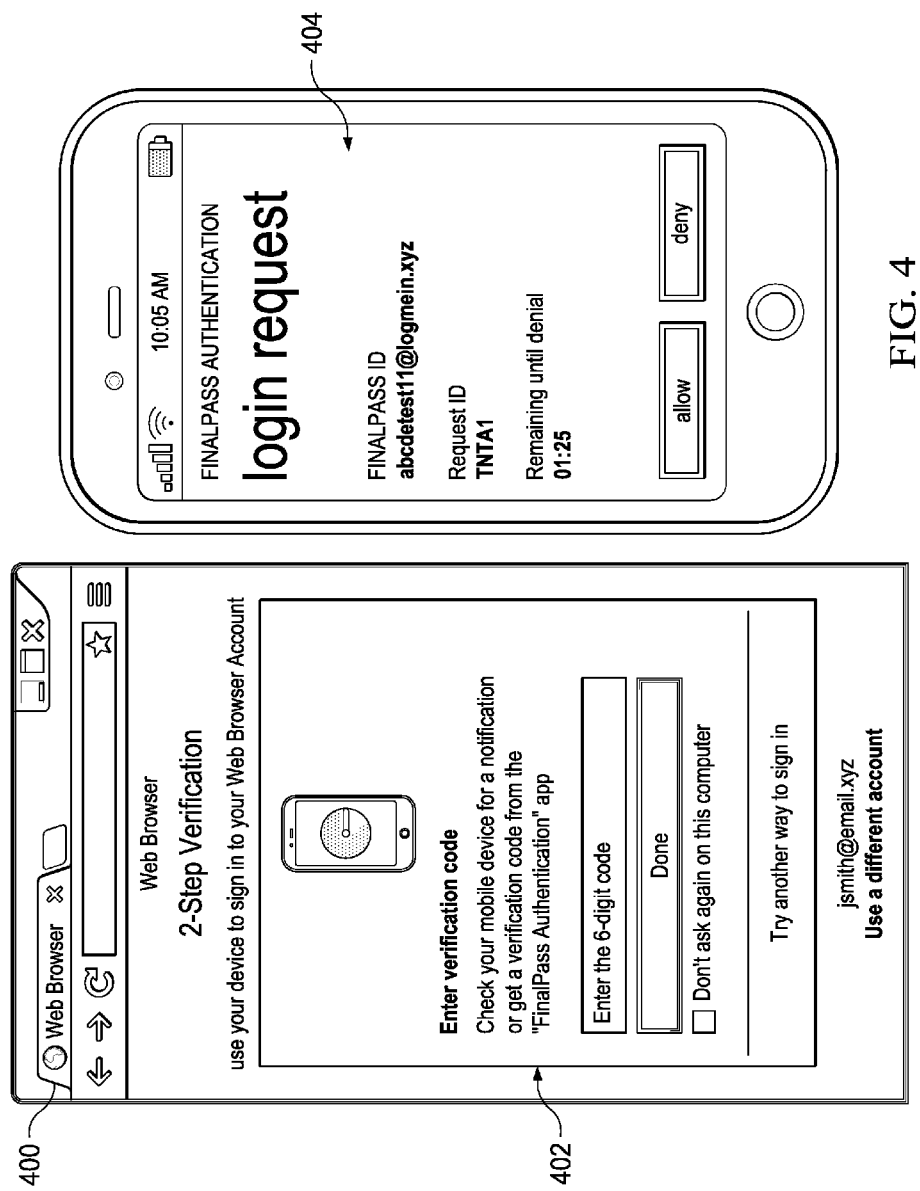

FIG. 4 depicts the browser 400 and the associated TOTP authentication page 402, and the mobile device authenticator app 404 upon receipt by the mobile device of the push notification. As depicted, preferably the push notification page includes allow and deny buttons, together with a timer that displays a timeout for the notification.

Figure 5:
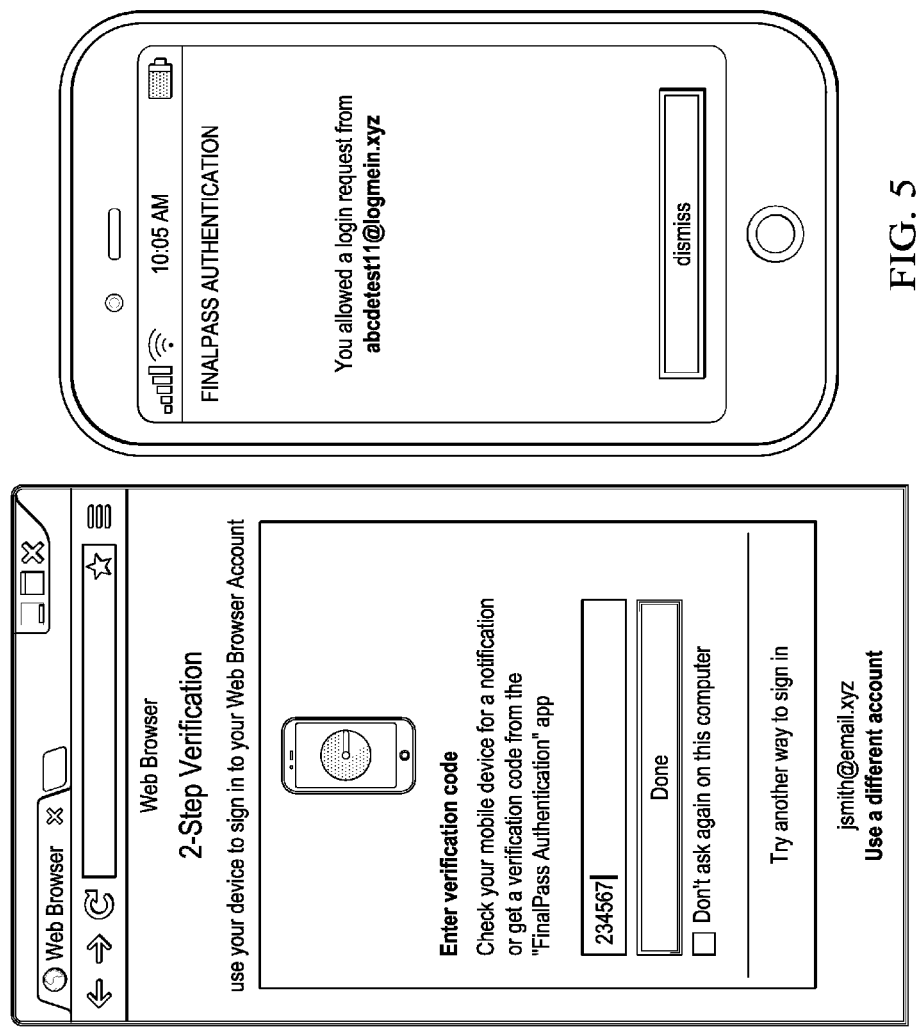
FIG. 5 depicts the browser plug-in injecting the TOTP code into the TOTP authentication page to enable programmatic login according to this disclosure.

Once the user selects allow (thus accepting the push notification), FIG. 5 depicts that browser plug-in operation by which the TOTP code is automatically populated in the HTML fill-in form and the form submitted to complete the programmatic login.

The solution enables push notification-based TOTP authentication even for cloud applications that do not otherwise support two factor authentication.

Enabling Technologies

A mobile device comprises a CPU (central processing unit), computer memory, such as RAM, and a drive. The device software includes an operating system (e.g., Apple iOS, Google® Android™, or the like), and generic support applications and utilities. The device may also include a graphics processing unit (GPU). It also includes a touch-sensing device or interface configured to receive input from a user's touch and to send this information to processor. The touch-sensing device typically is a touch screen. The touch-sensing device or interface recognizes touches, as well as the position, motion and magnitude of touches on a touch sensitive surface (gestures). The device typically also comprises a high-resolution camera for capturing images (e.g., QR codes), an accelerometer, a gyroscope, and the like.

The push notification may be provided to the mobile device in any convenient manner, e.g., Apple Push Notification (APN) Service (APN), Google push notification services (for iOS or Android), or the like.

The authenticator app may be the LastPass® mobile password manager authenticator app (or equivalent), which is augmented to include the capability to call the cloud service to store the TOTP shared secret per user per site, as described above.

The TOTP secrets per site per user are securely stored in the cloud service using a secure repository, such as LogMeIn Cubby® or equivalent.

The cloud service may be associated with a remote access technology platform and service, such as LogMeIn.

In one embodiment, a cloud service provider provides the cloud service, the mobile device authenticator app, and the browser plug-in.

In another embodiment, the cloud service provider provides the cloud service and the mobile device authenticator app.

The cloud service is a technology platform that may comprise co-located hardware and software resources, or resources that are physically, logically, virtually and/or geographically distinct. Communication networks used to communicate to and from the platform services may be packet-based, non-packet based, and secure or non-secure, or some combination thereof.

More generally, the cloud service comprises a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, that provide the functionality of a given system or subsystem. As described, the functionality may be implemented in a standalone machine, or across a distributed set of machines.

The computing entity on which the browser and its associated browser plug-in run may be any network-accessible computing entity that is other than the mobile device that runs the authenticator app itself. Representative entities includes laptops, desktops, workstations, other mobile devices or machines associated with such other mobile devices, and the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject disclosure also relates to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like.

The described commercial products, systems and services are provided for illustrative purposes only and are not intended to limit the scope of this disclosure.

The described technique may include other variants. In yet another alternative, the TOTP secret need not be maintained in the cloud service, but rather is maintained at the host (e.g., in a secure data store). After the push notification, the locally-stored secret is then used to generate the TOTP code, which is then populated (once again by the plug-in) into the fill-in form. In this example variant, the various operations involving the cloud service are not required.

In another variant, the dynamic generation and injection of the TOTP code (derived from the shared secret) occurs in a single device solution, in which case even the push notification may not be required.

The techniques herein provide for improvements to technology or technical field, namely, cloud-based access control, as well as improvements to various technologies such as secure authentication, and the like, all as described.

Having described our invention, what we now claim is as follows.

The invention claimed is:

1. A system, comprising:
 a set of hardware processors each having memory associated therewith;
 a mobile device authenticator app executed by a first processor of the set;
 a network-accessible cloud service executed by a second processor of the set and having a data repository;
 a browser plug-in adapted to be executed by a third processor of the set in an end user computing system distinct from the mobile device and the network-accessible cloud service;
 the mobile device authenticator app operative to receive a scan of a first code from a TOTP authentication setup page at each site of a plurality of sites, to generate a TOTP shared secret per site based on the scan of the first code, and to forward to the cloud service the TOTP shared secret for each site;
 the cloud service operative to store for the user the TOTP shared secret for each site;
 the browser plug-in operative to detect display of a TOTP authentication page associated with a site, the site being one of a plurality of sites for which a TOTP shared secret has been obtained by the authenticator app;
 the browser plug-in being further operative to respond to detection of the display of the TOTP authentication page to issue to the cloud service a request to initiate a push authentication interaction between the cloud service and the authenticator app;
 the cloud service further operative in response to receipt of a push authentication interaction request to send a push notification to the authenticator app to determine whether TOTP-login to the site should proceed;
 the mobile device authenticator app further operative in response to receipt of a confirmation of the push notification to notify the cloud service that TOTP login should proceed;
 the cloud service further operative in response to receipt of the confirmation to use the TOTP shared secret for the site to generate a TOTP code, and to forward the TOTP code generated to the browser to enable the TOTP-login to be completed programmatically by the browser plug-in; and
 the browser plug-in further operative to respond to receipt of a TOTP code generated by the cloud service upon a successful completion of the push authentication interaction to automatically inject the TOTP code into the TOTP authentication page and activate a login attempt from the TOTP authentication page, the TOTP code being generated dynamically after detection by the browser plug-in of the TOTP authentication page.

2. The system as described in claim 1 wherein the network-accessible cloud service includes an identity manager.

3. The system as described in claim 1 wherein the identity manager is associated with a web-based remote-access service.

4. The system as described in claim 1 wherein the authenticator app is used to obtain the TOTP shared secret per site for the user for each of the plurality of sites.

5. The system as described in claim 1 wherein the cloud service includes an application programming interface (API) over which the browser plug-in interaction occurs.

6. The system as described in claim 1 wherein the browser plug-in injects the TOTP code into an HTML fill-in form of the TOTP authentication page.

7. The system as described in claim 6 wherein the plug-in activates a login attempt from the TOTP authentication page by programmatically clicking a submit button on the TOTP authentication page.

8. The system as described in claim 1 wherein the mobile device authenticator app notifies the cloud service that TOTP login should proceed only when the confirmation of the push notification is received within a given timeout.

9. A method, comprising:
 providing an authenticator app configured to be executed in a mobile device;
 providing a cloud service that is network-accessible;
 providing a browser plug-in configured to be executed in a user computing system that is distinct from the mobile device and the cloud service, the user computing system having an associated browser;
 by the authenticator app: receiving a scan of a first code from a TOTP authentication setup page at each site of a plurality of sites, generating a time-based, one-time password (TOTP) shared secret per site based on the scan of the first code, and forwarding to the cloud service the TOTP shared secret for each site;
 by the cloud service: storing for the user the TOTP shared secret for each site;
 by the browser plug-in: (i) detecting display by the browser of a TOTP authentication page associated with a site, the site being one of the plurality of sites for which a TOTP shared secret has been obtained by the authenticator app, (ii) responsive to detecting display of the TOTP authentication page, obtaining a TOTP code by the following sub-steps: (a) issuing to the cloud service a request to initiate a push authentication interaction between the cloud service and the authenticator app; (b) responsive to the cloud service receiving a push interaction request, sending a push notification from the cloud service to the authenticator app to determine whether a TOTP-login to the site should proceed; (c) responsive to receipt of a confirmation of the push notification, the authenticator app notifying the cloud service that TOTP login should proceed, and (d) the cloud service thereafter using the TOTP shared secret for the site to generate the TOTP code and forward the TOTP code to the browser; (iii) automatically injecting the TOTP code into a fill in field of the TOTP authentication page, and (iv) automatically activating a login attempt from the TOTP authentication page wherein the TOTP code is generated dynamically after detection by the browser plug-in of the TOTP authentication page.

10. The method as described in claim 9 wherein the login attempt is activated from the TOTP authentication page by programmatically clicking a submit button on the TOTP authentication page.

11. The method as described in claim 9 wherein the TOTP code is injected by the browser plug-in into an HTML fill-in form of the TOTP authentication page.

12. The method as described in claim 9 wherein the authenticator app obtains the TOTP shared secret per site for the user for each of the plurality of sites.

13. The method as described in claim 9 wherein the authenticator app notifies the cloud service that TOTP login should proceed only when the confirmation of the push notification is received within a given timeout.

14. A computer program product in non-transitory computer readable media, the computer program product holding computer program instructions, the computer program instructions comprising (i) an authenticator app configured to be executed in a mobile device; (ii) a cloud service that is network-accessible; and (iii) a browser plug-in configured to be executed in a user computer system that is distinct from the mobile device and the cloud service, the user computing system having an associated browser, the computer program instructions executed to perform a set of operations, the operations comprising:

by the authenticator app: receiving a scan of a first code from a TOTP authentication setup page at each site of a plurality of sites, generating a time-based, one-time password (TOTP) shared secret per site based on the scan of the first code, and forwarding to the cloud service the TOTP shared secret for each site;

by the cloud service: storing for the user the TOTP shared secret for each site;

by the browser plug-in: (i) detecting display by the browser of a TOTP authentication page associated with a site, the site being one of the plurality of sites for which a TOTP shared secret has been obtained by the authenticator app, (ii) responsive to detecting display of the TOTP authentication page, obtaining a TOTP code by the following sub-steps: (a) issuing to the cloud service a request to initiate a push authentication interaction between the cloud service and the authenticator app; (b) responsive to the cloud service receiving a push interaction request, sending a push notification from the cloud service to the authenticator app to determine whether a TOTP-login to the site should proceed; (c) responsive to receipt of a confirmation of the push notification, the authenticator app notifying the cloud service that TOTP login should proceed, and (d) the cloud service thereafter using the TOTP shared secret for the site to generate the TOTP code and forward the TOTP code to the browser; (iii) automatically injecting the TOTP code into the TOTP authentication page, and (iv) automatically activating a login attempt from the TOTP authentication page, wherein the TOTP code is generated dynamically after detection by the browser plug-in of the TOTP authentication page.

15. The computer program product as described in claim 14 wherein the login attempt is activated from the TOTP authentication page by programmatically clicking a submit button on the TOTP authentication page.

16. The computer program product as described in claim 14 wherein the TOTP code is injected by the browser plug-in into an HTML fill-in form of the TOTP authentication page.

17. The computer program product as described in claim 14 wherein the authenticator app obtains the TOTP shared secret per site for the user for each of the plurality of sites.

18. The computer program product as described in claim 14 wherein the authenticator app notifies the cloud service that TOTP login should proceed only when the confirmation of the push notification is received within a given timeout.

* * * * *